US011322059B2

(12) United States Patent
Kim et al.

(10) Patent No.: US 11,322,059 B2
(45) Date of Patent: May 3, 2022

(54) AGING SYSTEM AND AGING METHOD OF DISPLAY DEVICE

(71) Applicant: Samsung Display Co., Ltd., Yongin-si (KR)

(72) Inventors: Hyun Ae Kim, Hwaseong-si (KR); Kyung Min Lee, Hwaseong-si (KR); Hyung Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 422 days.

(21) Appl. No.: 16/568,140

(22) Filed: Sep. 11, 2019

(65) Prior Publication Data

US 2020/0160765 A1 May 21, 2020

(30) Foreign Application Priority Data

Nov. 19, 2018 (KR) ........................ 10-2018-0142760

(51) Int. Cl.
*G09G 3/00* (2006.01)
*G06K 9/62* (2022.01)

(52) U.S. Cl.
CPC .......... *G09G 3/006* (2013.01); *G06K 9/6202* (2013.01); *G09G 2320/043* (2013.01)

(58) Field of Classification Search
CPC ............. G09G 3/006; G09G 2320/043; G09G 2330/12; G06K 9/6202; G01M 11/00; H01L 51/56; H01L 2251/562; G01N 21/95
See application file for complete search history.

(56) References Cited

U.S. PATENT DOCUMENTS

2017/0221421 A1* 8/2017 Wang .................. H01L 27/3276

FOREIGN PATENT DOCUMENTS

| | | | |
|---|---|---|---|
| KR | 10-1144638 | B1 | 5/2012 |
| KR | 101144638 | B1 * | 5/2012 |
| KR | 10-2014-0055497 | A | 5/2014 |
| KR | 10-2015-0144391 | A | 12/2015 |
| KR | 10-1833474 | B1 | 4/2018 |

* cited by examiner

*Primary Examiner* — Mark W Regn
(74) *Attorney, Agent, or Firm* — Lewis Roca Rothgerber Christie LLP

(57) ABSTRACT

An aging system according to an embodiment includes an aging pad inspector for inspecting an aging pad of a display device, an aging aligner for aligning the aging pad with a probe, and an aging processor for applying an aging signal to the display device through the aging pad and through the probe.

15 Claims, 5 Drawing Sheets

AGING SYSTEM AND AGING METHOD OF DISPLAY DEVICE

CROSS-REFERENCE TO RELATED APPLICATION

This application claims priority to, and the benefit of, Korean Patent Application No. 10-2018-0142760 filed in the Korean Intellectual Property Office on Nov. 19, 2018, the entire contents of which are incorporated herein by reference.

BACKGROUND

1. Field

The present disclosure relates to an aging system and an aging method of a display device.

2. Description of the Related Art

A display device, such as an organic light emitting diode display, a liquid crystal display, etc., is widely used. The display device includes a display panel including pixels for displaying an image. In addition to the pixels, driving devices and pads for inputting signals used to control the driving devices, and signal lines connected to the pads and transmitting the signals, are formed in the display panel.

In the organic light emitting diode display, when an organic light emitting element is directly lit after an organic film is deposited, the luminance may decrease relatively rapidly due to an initial degradation phenomenon. In addition, a white balance due to a mixture of a red pixel, a green pixel, and a blue pixel may be degraded in a short time.

The above information disclosed in this Background section is only for enhancement of understanding of the background of the disclosure and therefore it may contain information that does not form the prior art that is already known in this country to a person of ordinary skill in the art.

SUMMARY

Embodiments of the present disclosure provide an aging system for a display device that is capable of improving the lifetime, luminance non-uniformity, and luminance ratio of a display device through a reliable aging system, and an aging method using the system.

An aging system according to an embodiment includes an aging pad inspector for inspecting an aging pad of a display device, an aging aligner for aligning the aging pad with a probe, and an aging processor for applying an aging signal to the display device through the aging pad and through the probe.

The aging pad inspector may include an aging pad imager for capturing a photographed image of the aging pad.

The aging pad inspector may further include an aging pad comparator for comparing the photographed image of the aging pad with a normal state image.

The aging pad comparator may be configured to compare a portion of the photographed image of the aging pad with a corresponding portion of the normal state image to determine whether a number of pixels of the photographed image of the aging pad that are different to corresponding pixels of the normal state image is equal to or greater than 15% of a total number of pixels.

The aging system may further include a display device discharger for discharging the display device when the number of the pixels of the photographed image of the aging pad that are different to the corresponding pixels of the normal state image is equal to or greater than 15% as determined by the aging pad comparator.

The aging system may further include a code reader for reading a code of the display device, and for storing measured information.

The aging system may further include a characteristic and image inspector for inspecting whether the pixels of the display device are normally operated.

An aging method according to an embodiment includes inspecting an aging pad of a display device, an aging-alignment operation of aligning the aging pad with a probe, and proceeding with aging.

The inspecting of the aging pad may include photographing the aging pad.

The inspecting of the aging pad may further include comparing a photographed image of the aging pad with a normal state image.

The comparing of the photographed image of the aging pad with the normal state image may include comparing a portion of the photographed image of the aging pad with a corresponding portion of the normal state image to determine whether a number of pixels of the photographed image of the aging pad that are different to corresponding pixels of the normal state image is equal to or greater than 15% of a total number of pixels.

The aging-alignment operation and the aging may be performed only when the number of pixels of the photographed image of the aging pad that are different to the corresponding pixels of the normal state image is less than 15% of a total number of pixels.

The aging-alignment operation may include aligning an alignment mark formed in the display device to an accurate position by using an alignment camera.

The photographing the aging pad may include using the alignment camera.

The aging may include applying an aging signal to the display device through the aging pad.

According to the embodiments, productivity and efficiency of the display device may be increased and the cost may be reduced through the aging process with high reliability.

DETAILED DESCRIPTION

Figure 1:
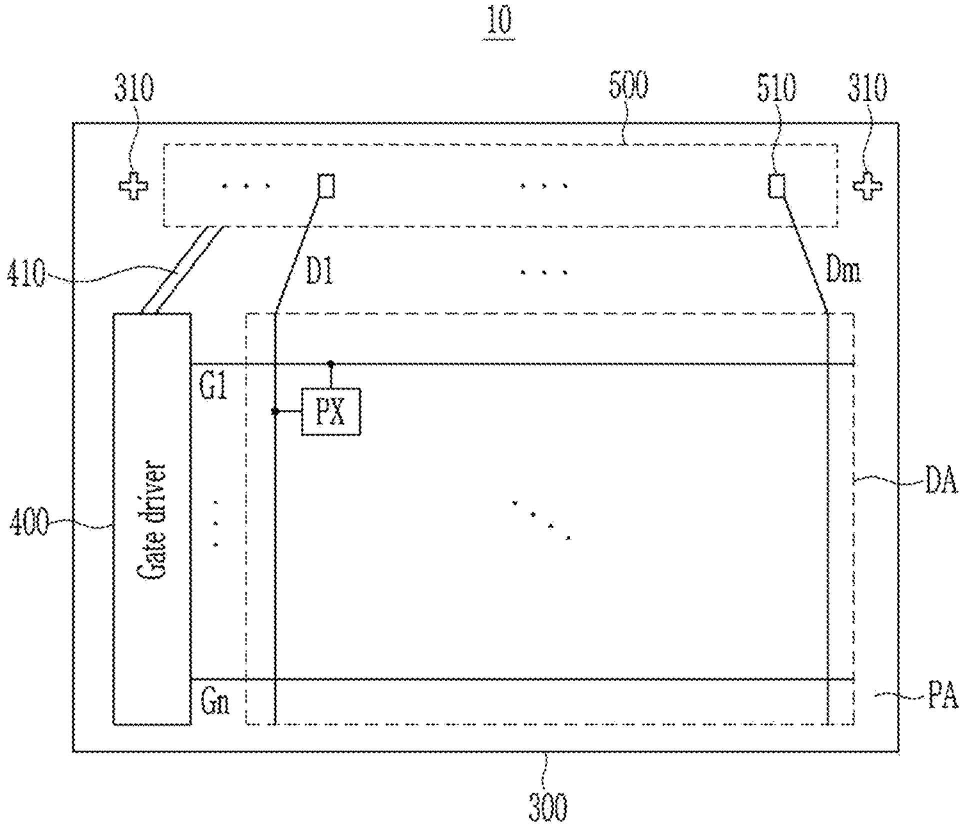
FIG. 1 is a view schematically showing a display device to which aging is applied according to an embodiment.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Further, in this specification, the phrase "on a plane" means viewing a target portion from the top, and the phrase "on a cross-section" means viewing a cross-section formed by vertically cutting a target portion from the side.

First, a display device to which aging is applied (e.g. which undergoes aging) according to an embodiment is described with reference to FIG. 1. FIG. 1 is a view schematically showing a display device to which aging is applied according to an embodiment.

Referring to FIG. 1, a display device 10 may be various display devices such as a liquid crystal display (LCD), an organic light emitting diode (OLED) display, etc. The display device 10 includes a display panel 300 having a display area DA and a peripheral area PA.

The display area DA of the display panel 300 is a region for displaying an image. In the display area DA, a plurality of gate lines G1 to Gn, a plurality of data lines D1 to Dm, and a plurality of pixels PX connected to the plurality of gate lines G1 to Gn and the plurality of data lines D1 to Dm are located. The gate lines G1 to Gn transmit a gate signal, and the data lines D1 to Dm transmit a data voltage. The pixel PX is referred to as a minimum unit for displaying an image, and the display device displays the image through a plurality of pixels PX. Each pixel PX may include a switching element connected to one of the gate lines G1 to Gn and to one of the data lines D1 to Dm, and a pixel electrode. The switching element may be a three-terminal element, such as a thin film transistor integrated with the display panel 300.

The peripheral area PA is located on a circumference region (e.g., at a perimeter) of the display area DA, and elements or wires for generating or transmitting various signals applied to the display area DA are located in the peripheral area PA.

A gate driver 400 is integrated in or located in the peripheral area PA of the display panel 300, and sequentially transmits the gate signal to the plurality of gate lines G1 to Gn. The gate signal includes a gate-on voltage Von and a gate-off voltage Voff. The gate driver 400 receives, through a control signal line 410, a scanning start signal instructing an output start of a gate-on pulse, and a gate clock signal controlling output timing of the gate-on pulse, for sequentially driving the plurality of gate lines G1 to Gn. The control signal line 410 may be located in the peripheral area PA of the display panel 300. It is shown that the gate driver 400 is located on one side of the display panel 300, however it is possible for it to be located on both sides.

A pad unit 500 is located on the peripheral area PA of the display panel 300. A plurality of pads 510 connected to the control signal line 410 and respective ones of the data lines D1 to Dm are located in the pad unit 500. The pad 510 may be in contact with a flexible printed circuit board (FPCB) to receive the signals to be applied to the control signal line 410 and the data lines D1 to Dm of the display panel 300.

An alignment mark 310 for aligning the pad 510 at a correct position during a manufacturing process may be located in the peripheral area PA. Although the alignment mark 310 is illustrated as having a cross shape, this is only illustrative, and the alignment mark 310 may have any shape.

Figure 2:
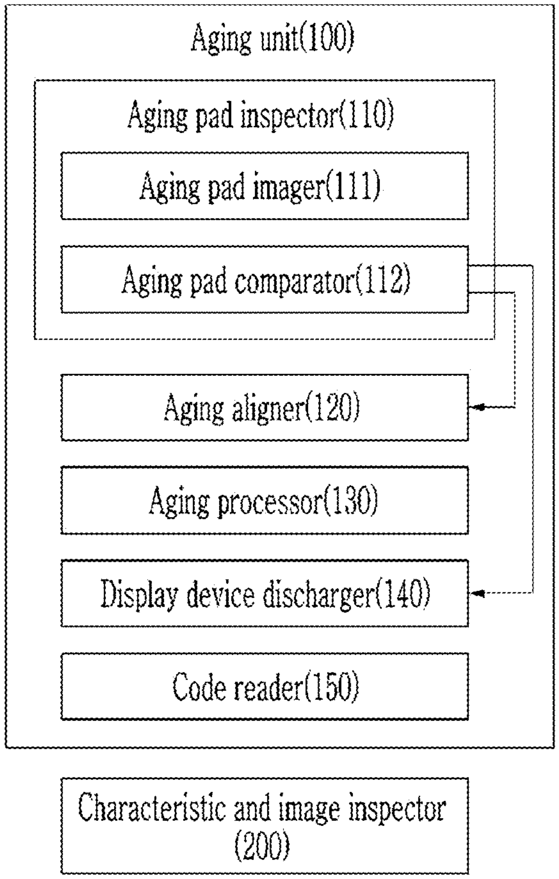
FIG. 2 is a block diagram of an aging system of a display device according to an embodiment.

The aging system for executing the aging according to an embodiment is now described with reference to FIG. 2. FIG. 2 is a block diagram of an aging system of a display device according to an embodiment.

Referring to FIG. 2, the aging system according to an embodiment includes an aging unit 100, and a characteristic and image inspector 200.

The aging unit 100 includes an aging pad inspector (e.g., an aging-pad-inspection unit) 110, an aging aligner (e.g., an aging-alignment unit) 120, an aging processor (e.g., an aging-processing unit) 130, a display device discharger (e.g., a display-device-discharging unit) 140, and a code reader (e.g., a code-reading unit) 150.

The aging pad inspector 110 inspects for a foreign body, carbonization, etc. of the aging pad. The aging pad is a pad that is contacted with a probe when performing the aging, and may be the pad 510 shown in FIG. 1. However, it is not limited thereto, and a pad that is separately formed to extend from the pad 510 of FIG. 1 is possible.

The aging pad inspector 110 includes an aging pad imager (e.g., an aging-pad-photographing unit) 111 and an aging pad comparator (e.g., an aging-pad-comparing unit) 112. The aging pad imager 111 may photograph the aging pad of the display device by using a camera. The camera for photographing (e.g., for capturing a photographed image of) the aging pad may be an alignment camera used for aging alignment, as described later. However, the present disclosure is not limited to this, and the aging pad may be photographed using a separate camera.

The aging pad comparator 112 compares the image of the aging pad that is to be inspected and that is photographed by the aging pad imager 111 with a normal state image (e.g., a baseline image). The normal state image is an image of the aging pad that does not include foreign particles and is not carbonized. The aging pad comparator 112 may compare the appearance of the aging pad of the normal state image with that of the image of the aging pad to be inspected to be quantified (e.g., to quantify a difference between the images). For example, a brightness difference for each pixel may be compared from the image of the aging pad to be inspected and the normal state image. Whether the image of the aging pad to be inspected and the normal state image are the same may be measured by comparing the brightness of the pixel of each corresponding position, and by comparing the number of pixels having different brightness to the entire number of pixels.

In the present example, only a display device of which the number of pixels that have a different brightness from corresponding pixels of the normal state image is less than 15% with respect to the total number of pixels may be determined as a normal, or acceptable, display device, and the aging alignment and the aging described below may be performed on the display device. In contrast, in the case of a display device of which the number of pixels having different brightness from corresponding pixels of the normal state image is greater than, or equal to, 15% with respect to the total number of pixels, the display device may be discharged from the aging system through the display device discharger 140 without performing aging on the display device.

A comparison of the normal state image and the image of the aging pad that is to be inspected is described. However, the present disclosure is not limited to this, and any method used to quantify the pad shapes by comparing the normal state image with the image of the aging pad to be inspected may be included.

The aging aligner 120 aligns the aging pad of the display device so that the aging pad of the display device and the probe of the aging system may be correctly bonded. Only display devices determined to be normal/acceptable by the aging pad comparator 112 may be aligned for the aging progress in the aging aligner 120. For accurate bonding of the aging pad and the probe, the display device may include an alignment mark, and an alignment camera may be used to adjust the alignment mark to the correct position.

The aging processor 130 bonds the aging pad of the display device and the probe of the aging system, and applies the aging signal (e.g., for a predetermined amount of time) to the display device through the probe of the aging system and the aging pad of the display device, which are bonded to each other. The aging time may vary depending on a voltage magnitude of the aging signal and the characteristics of the display device. The voltage of the aging signal may be higher than the voltage for normal operation of the display device, and may be applied to each pixel through the gate line and the data line corresponding thereto to thereby induce high luminance emission. Thus, an initially unstable display device may be stabilized through the aging.

For example, in the case of an organic light emitting diode display, when a high voltage is applied, as a high current flows through the OLED, and as the OLED emits light with high luminance, an initial luminance reduction is accelerated. Accordingly, the luminance of all of the pixels is deteriorated to a certain level as a whole, or overall, so that a so-called burn-in phenomenon in which a residual image or smear remains on the screen does not occur, or may be reduced to improve the quality of the display, and a white balance may be maintained for a relatively long time. The burn-in phenomenon is caused by the characteristics of the OLED of which a corresponding lifetime differs depending on a usage amount of each pixel. In addition, the high current supplied to the OLED may improve the reliability of the product by eliminating a dark spot that may be formed in the OLED.

The code reader 150 may read the code assigned to each display device, and may store information of the measured display device in the corresponding code.

The characteristic and image inspector (e.g., a characteristic-and-image-inspecting unit) 200 may check whether the pixels of the display device are operating normally. The characteristic and image inspector 200 may apply the driving signal and the data signal through the inspecting pad on the display device before the FPCB is bonded to the display device to check whether all the pixels of the display device are operated normally. The inspecting pad can be the same pad as the aging pad, and can be the same pad as the pad connected to the FPCB.

Next, the aging method according to an embodiment is described with reference to FIG. 3 and FIG. 4.

Figure 3:
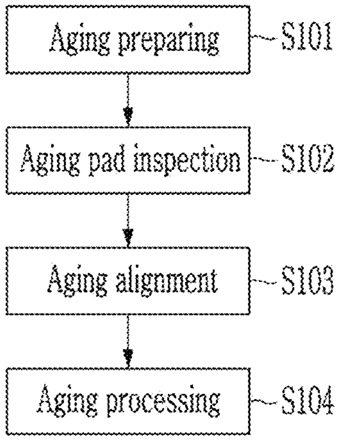
FIG. 3 is a flowchart showing an aging method of a display device according to an embodiment.

FIG. 3 is a flowchart showing an aging method of a display device according to an embodiment.

Referring to FIG. 3, the aging method of the display device includes an operation (S101) of preparing for the aging. The operation (S101) of preparing the aging may be performed by forming the aging pad on a mother substrate, and by cutting each display device from the mother substrate. The mother substrate is a device that is eventually cut into unit display devices, and includes a plurality of display devices adjacent to each other.

Next, the aging method includes an operation (S102) of inspecting the aging pad. The operation (S102) of inspecting the aging pad may be performed by using the camera to photograph the aging pad to be inspected, and by comparing the image of the aging pad to be inspected and the previously prepared normal state image. The normal state image may be digitally stored in the memory, which is described later in detail in FIG. 4. When the image of the aging pad to be inspected is compared with the normal state image, and when the image of the aging pad to be inspected and the normal state image are same by a certain level, or to a certain degree, or more, it may be determined that the aging pad is normal.

When the image of the aging pad to be inspected is compared with the normal state image, and when the aging pad is not equal to, or more than, a certain level, the corresponding display device may be discharged, or rejected, without performing the aging. For example, when the image of the aging pad and the normal state image differ by equal to, or more than, 15%, the display device may be discharged.

When the aging pad to be inspected is normal, as determined by an inspection result of the aging pad, the aging-alignment operation (S103) may be performed. The aging-alignment operation (S103) is performed by aligning the aging pad so that the aging pad of the display device and the probe of the aging system are bonded at an accurate position. The aging pad of the display device may be located at the accurate position by using the alignment mark (e.g., alignment mark 310) formed in the display device, and the position of the alignment mark may be confirmed by using the alignment camera.

Next, the aging is performed (S104). The aging may be performed by bonding the aging pad of the display device and the probe of the aging system, and by applying the aging signal to the display device (e.g., for a predetermined amount of time) through the bonded probe and aging pad. In detail, the operation (S104) of performing the aging may be performed by applying the aging signal to the data line and the gate line included in the display device.

Figure 4:
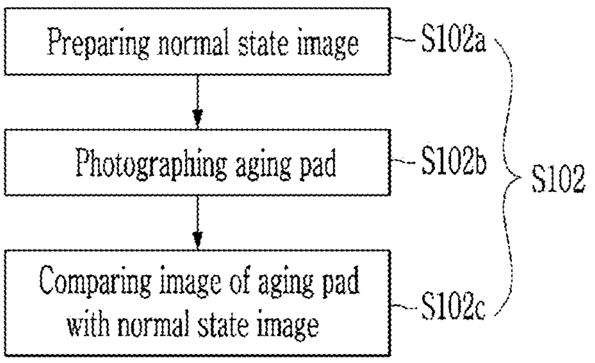
FIG. 4 is a flowchart showing an operation for inspecting an aging pad.

FIG. 4 is a flowchart showing the operation (S102) of inspecting the aging pad of FIG. 3. First, the operation of inspecting the aging pad includes the operation (S102*a*) of preparing the normal state image. The normal state image is the image of the aging pad of the display device where there is no foreign substance or bubble on the aging pad. The normal state image may be stored in a memory or the like.

Next, the operation (S102*b*) of photographing the aging pad of the display device to be inspected is performed. The operation (S102*b*) of photographing the aging pad may be performed by photographing the aging pad to be inspected using the camera. The camera may be an alignment camera used for the aging alignment, however it is not limited thereto, and a separate camera may be used.

After photographing the aging pad, an operation (S102*c*) of comparing the image of the aging pad to be inspected with the normal state image is performed. The operation (S102*c*) of comparing the image of the aging pad to be inspected with the normal state image may be performed by comparing the image of the aging pad to be inspected and the normal state image by a predetermined size unit (e.g., by comparing a portion of the aging pad to be inspected captured in the image with a corresponding portion of the normal state image), and by quantifying to what degree the image of the aging pad to be inspected equals the normal state image.

For example, the brightness of the pixels at respective corresponding positions in the image of the aging pad to be inspected and the normal state image may be compared to measure whether they are the same, and the ratio of the number of pixels having different brightness (e.g., having a brightness that is different from the corresponding pixels of the normal state image) to the total number of the pixels may be measured.

When the image of the aging pad to be inspected and the normal state image are equal to, or more than, a certain level, it is determined to be normal, and operations of the aging alignment and the aging may proceed. For example, when the ratio of the number of the pixels with different brightness to the total number of pixels is less than 15%, then the aging pad may be considered as normal, and when the ratio of the number of pixels with different brightness to the total number of the pixels is equal to, or more than, 15%, the aging pad may be regarded as abnormal. As described in the example above, only in the case that the aging pad is normal is the aging performed, and in the case that the aging pad is abnormal, the aging is not performed, and the corresponding display device is discharged.

Figure 5:
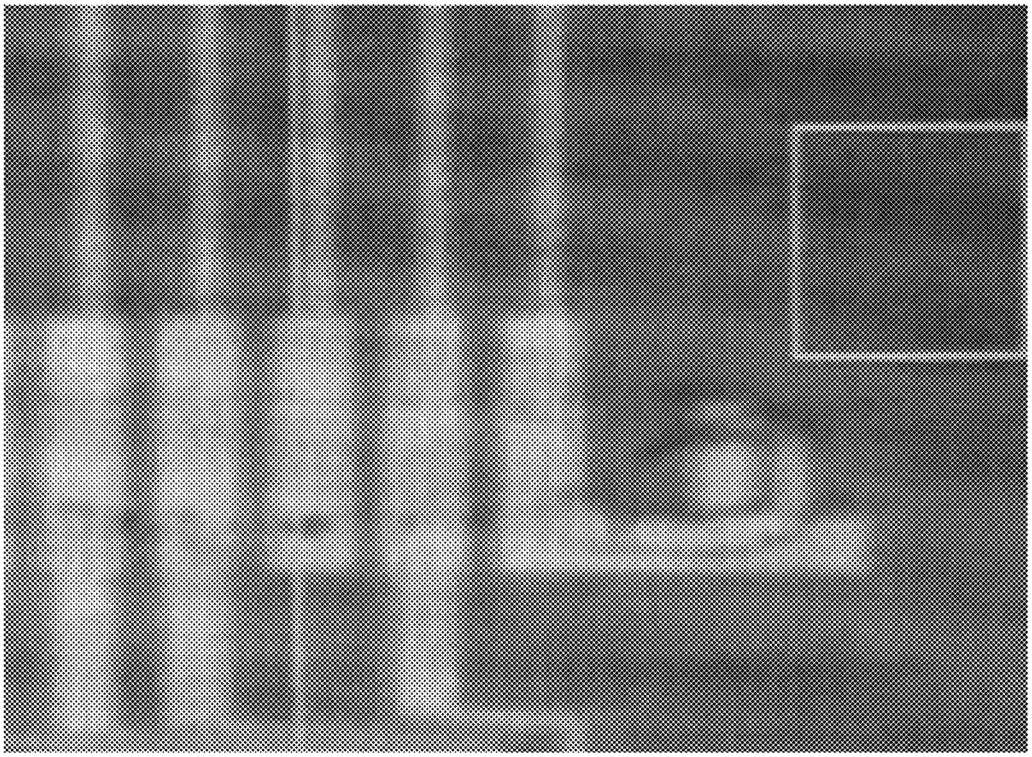
FIG. 5 is a view showing an image of an aging pad, according to an example.

FIG. 5 is the image of the aging pad, according to an example. Referring to FIG. 5, it may be confirmed that foreign particles are present on the aging pad through the image of the aging pad. When there is a foreign particle or bubble on the aging pad, or when the aging pad is carbonized, the aging equipment may be damaged by an overcurrent when the aging with a high voltage is performed. The damage to the aging equipment may lead to damage to the subsequent normal display device, and time or cost may be incurred by a repair or replacement of the damaged aging equipment. Therefore, it is possible to prevent the aging equipment and other display devices from being damaged by selectively discharging, or rejecting, the display device including the aging pads contaminated by foreign particles by confirming foreign particles and/or bubbling of the aging pad in advance, thereby increasing productivity and efficiency.

While embodiments of the disclosure have been described in connection with what is presently considered to be practical embodiments, it is to be understood that the invention is not limited to the disclosed embodiments, but, on the contrary, is intended to cover various modifications and equivalent arrangements included within the spirit and scope of the appended claims, with functional equivalents thereof to be included therein.

| Description of symbols | |
|---|---|
| 10: display device | 100: aging unit |
| 110: aging pad inspector | 120: aging aligner |
| 130: aging processor | 140: display device discharger |
| 150: code reader | 200: characteristic and image inspector |
| 300: display panel | 310: alignment mark |
| 400: gate driver | 500: pad unit |

What is claimed is:

1. An aging system comprising:

an aging pad inspector for inspecting an aging pad of a display device;

an aging aligner for aligning the aging pad with a probe; and an aging processor for applying an aging signal to the display device through the aging pad and through the probe.

2. The aging system of claim 1, wherein the aging pad inspector comprises an aging pad imager for capturing a photographed image of the aging pad.

3. The aging system of claim 2, wherein the aging pad inspector further comprises an aging pad comparator for comparing the photographed image of the aging pad with a normal state image.

4. The aging system of claim 3, wherein the aging pad comparator is configured to compare a portion of the photographed image of the aging pad with a corresponding portion of the normal state image to determine whether a number of pixels of the photographed image of the aging pad that are different to corresponding pixels of the normal state image is equal to or greater than 15% of a total number of pixels.

5. The aging system of claim 4, further comprising a display device discharger for discharging the display device when the number of the pixels of the photographed image of the aging pad that are different to the corresponding pixels of the normal state image is equal to or greater than 15% as determined by the aging pad comparator.

6. The aging system of claim 4, further comprising a code reader for reading a code of the display device, and for storing measured information.

7. The aging system of claim 6, further comprising a characteristic and image inspector for inspecting whether the pixels of the display device are normally operated.

8. An aging method comprising:

inspecting an aging pad of a display device;

an aging-alignment operation of aligning the aging pad with a probe; and proceeding with aging.

9. The aging method of claim 8, wherein the inspecting of the aging pad comprises photographing the aging pad.

10. The aging method of claim 9, wherein the inspecting of the aging pad further comprises comparing a photographed image of the aging pad with a normal state image.

11. The aging method of claim 10, wherein the comparing of the photographed image of the aging pad with the normal state image comprises comparing a portion of the photographed image of the aging pad with a corresponding portion of the normal state image to determine whether a number of pixels of the photographed image of the aging pad that are different to corresponding pixels of the normal state image is equal to or greater than 15% of a total number of pixels.

12. The aging method of claim 11, wherein the aging-alignment operation and the aging are performed only when the number of pixels of the photographed image of the aging pad that are different to the corresponding pixels of the normal state image is less than 15% of a total number of pixels.

13. The aging method of claim 12, wherein the aging-alignment operation comprises aligning an alignment mark formed in the display device to an accurate position by using an alignment camera.

14. The aging method of claim 13, wherein the photographing the aging pad comprises using the alignment camera.

15. The aging method of claim 14, wherein the aging comprises applying an aging signal to the display device through the aging pad.

* * * * *